United States Patent [19]

Terasawa

[11] Patent Number: 4,543,589

[45] Date of Patent: Sep. 24, 1985

[54] CAPPING DEVICE FOR INK JET NOZZLE

[75] Inventor: Koji Terasawa, Mitaka, Japan

[73] Assignee: Canon Kabushiki Kaisha, Tokyo, Japan

[21] Appl. No.: 429,452

[22] Filed: Sep. 30, 1982

[30] Foreign Application Priority Data

Oct. 8, 1981 [JP] Japan ............................... 56-160425

[51] Int. Cl.[4] ............................................ G01D 15/18

[52] U.S. Cl. ................................................ 346/140 R

[58] Field of Search .................................. 346/140, 75

[56] References Cited

U.S. PATENT DOCUMENTS

| | | | |
|---|---|---|---|
| 3,945,020 | 3/1976 | Kraus | 346/140 X |
| 4,223,322 | 9/1980 | Raamsdonk | 346/140 |
| 4,340,897 | 7/1982 | Miller | 346/140 |
| 4,383,263 | 5/1983 | Ozawa | 346/140 |
| 4,410,900 | 10/1983 | Terasawa | 346/140 |

*Primary Examiner*—Joseph W. Hartary
*Attorney, Agent, or Firm*—Fitzpatrick, Cella, Harper & Scinto

[57] ABSTRACT

A capping device for capping the front end of an ink jet nozzle, wherein an ink absorbing element is provided in the nozzle capping unit in such a position as to be brought into contact with the front end of the ink jet nozzle.

4 Claims, 4 Drawing Figures

CAPPING DEVICE FOR INK JET NOZZLE

BACKGROUND OF THE INVENTION

1. Field of the Invention

The present invention relates to a capping device for an ink jet nozzle, and more particularly to such capping device capable of preventing defective printing caused by uneven wetting of the nozzle face at the suction recovery step of the nozzle.

2. Description of the Prior Art

As already known, an ink jet nozzle is utilized as the recording head for a recording apparatus in which liquid ink is emitted for recording on a printing sheet in response to electric signals. When such ink jet nozzle is subjected to a mechanical shock or a sudden temperature change, air enters the nozzle to destroy the normal meniscus, thus disabling the ink emission in response to electric signals. In order to resolve such non-emitting state, the nozzle is sucked from the front end thereof, thus restoring the normal meniscus. However, when the cap for the suction is lifted, ink may locally remain on the front end of the nozzle.

The above-mentioned phenomenon is more detailedly shown in FIGS. 1 to 3, wherein a recording head 1 positioned in an unrepresented carriage and integral with a sub-tank is provided with multiple nozzles 2. The outer diameter of each nozzle is in the order of 0.4 mm. In case of defective printing such as the lack of ink emission, a cap 3 moves toward the nozzles 2 to tightly cover said nozzles through an elastic member 4. A suction pump 6 is activated in this state to generate a negative pressure in a space 7 through a pipe 5, whereby the ink is extracted from the nozzles into the space 7. An air layer or other substance in the nozzle hindering the ink emission is ejected from the nozzle, thus enabling the ink emission. However, when the cap is lifted in the direction of arrow shown in FIG. 2, the extracted ink 8 is pulled in both directions by the nozzles and by the cap due to surface tension, and a part of said ink remains around the nozzles even if it is made water-repellent, whereby an ink pool 9 is formed around the nozzles. The ink emission is quite often hindered if such an ink pool exists. Also such an ink pool is apt to appear in the case of a multiple-nozzle recording head, since the space 7 of the elastic member 4 inevitably has an oval cross section with a reduced ink holding ability.

SUMMARY OF THE INVENTION

The object of the present invention is to provide a capping device for an ink nozzle not forming an ink pool around the front ends of nozzles when the cap is lifted therefrom.

Another object of the present invention is to provide a capping device capable of avoiding the formation of ink pool in a more secure manner.

Still another object of the present invention is to provide a capping device capable of ensuring that no part of ink absorbing element remains in the nozzles.

Still other objects of the present invention will become fully apparent from the following description of the preferred embodiments.

DETAILED DESCRIPTION OF THE PREFERRED EMBODIMENT

Figure 1:
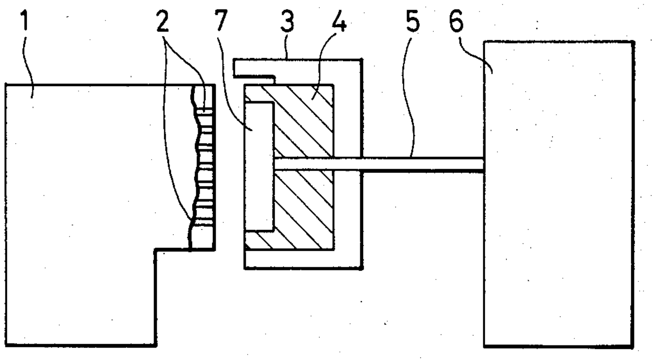
FIG. 1 PRIOR ART
FIG. 1 is a schematic view of a conventional capping device.
Figure 2:
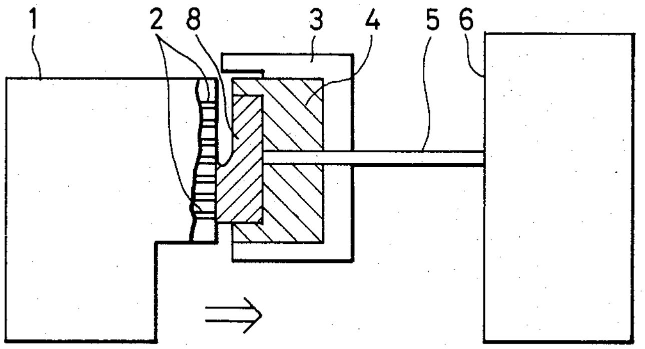
FIG. 2 PRIOR ART
FIG. 2 is a schematic view showing a state when the capping device shown in FIG. 1 is lifted.
Figure 3:
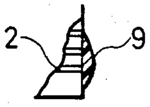
FIG. 3 PRIOR ART
FIG. 3 is a schematic view of an ink pool.
Figure 4:
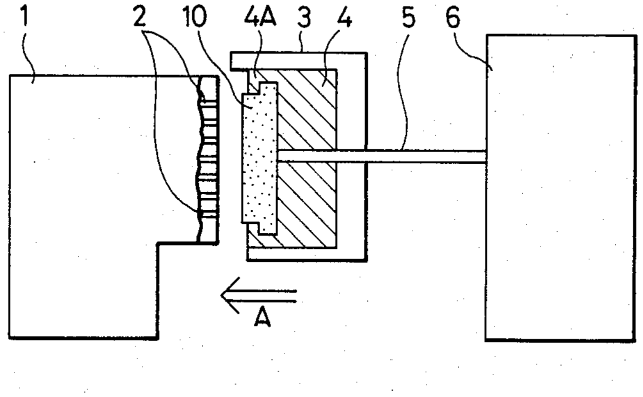
FIG. 4 is a schematic view of an embodiment of the present invention.

FIG. 4 shows an embodiment of the present invention, wherein an ink absorbing element 10, composed for example of low-formal sponge made principally from polyvinyl alcohol, swells when in a wet state and remains a wet state for several months when once wetted with ink, since the ink for ink jet printing dries very slowly. The ink absorbing element 10 is supported by an elastic member 4 positioned in the cap 3 in such position that it can be brought into contact with the multiple nozzles 2. The front face of said ink absorbing element 10 coming into contact with the nozzles protrudes from the front face of a rim 4A of the elastic member 4 surrounding and supporting said absorbing element 10. Consequently, when the cap 4 is moved in a direction A toward the nozzles, the wet ink absorbing element 10 is at first brought into contact with the front end of the multiple nozzles 2, and then the rim 4A of the elastic member 4 is brought into contact with the periphery of the multiple nozzles 2 to tightly enclose said nozzles. The ink absorbing element 10, being wetted with the ink and practically free from air, does not practically press the air into the nozzles when brought into contact therewith. Also when the cap is lifted from the nozzles, the ink absorbing element 10 retains the extracted ink because its absorbing ability is stronger than that of the nozzles, thus avoiding the formation of ink pool on the front end of the nozzles. Consequently the nozzles are capable of normal ink emission in response to electric signals immediately after the recovery step by suction.

The ink absorbing element 10, having a three-dimensional porous structure, has a pore diameter larger than the nozzle diameter which is for example in the range of 60 microns. Such larger pore diameter is selected in order to reduce the danger that a part of the ink absorbing element might be pressed into the nozzles when the element is pressed against the nozzles. A part of the ink absorbing element eventually squeezed into the nozzle may be torn off from the element and remain in the nozzle, thus disabling the ink emission from the nozzle. If the pore diameter of the ink absorbing element is larger than the nozzle diameter as explained above, the nozzle aperture is most probably covered by a pore of the element, thus reducing the possibility of intrusion of a part of the element into the nozzle. Also larger pores of the ink absorbing member provide a larger capacity as the ink reservoir. Consequently the ink remaining around the nozzles at the lifting of the cap is entirely absorbed into the ink reservoir.

It is to be noted that the present invention is by no means limited to the foregoing embodiment but also is applicable to a capping device not provided with the suction recovery function.

As explained in the foregoing, the present invention enables to retain the extracted ink in an ink absorbing element when the cap is lifted from the nozzles, thereby avoiding the formation of ink pool on the front end of nozzles and thus ensuring satisfactory ink emission.

What I claim is:

1. A capping device for an ink jet printer comprising: means for generating a negative pressure; and means for covering the front end of an ink jet head including ink jet nozzles, said covering means including an ink absorbing element and an elastic member surrounding said ink absorbing element and arranged in such a position as to be brought into contact with the ink jet head to tightly seal the front end of the head after said ink absorbing element is brought into contact with the front end of the head when the front end of the head is covered with said covering means, said ink absorbing element being arranged in such a position as to be brought into contact with the front end of the head and being adapted to apply the negative pressure generated by said negative pressure generating means to the front end of the head through said ink absorbing element thereby extracting ink in the nozzles.

2. A capping device according to claim 1, wherein said ink absorbing element is composed of a material which swells in wet state.

3. A capping device for an ink jet printer comprising:

means for generating a negative pressure; and means for covering the front end of an ink jet head including ink jet nozzles, said covering means being provided with an ink absorbing element in such a position as to be brought into contact with the front end of the head and being adapted to apply the negative pressure generated by said negative pressure generating means to the front end of the head through said ink absorbing element thereby extracting ink in the nozzles, wherein said ink absorbing element is composed of a porous substance having a pore diameter larger than the diameters of the nozzles.

4. A capping device according to claim 3, wherein said ink absorbing element is composed of a material which swells in wet state.

* * * * *

UNITED STATES PATENT AND TRADEMARK OFFICE

CERTIFICATE OF CORRECTION

PATENT NO. : 4,543,589

DATED : September 24, 1985

INVENTOR(S) : KOJI TERASAWA

It is certified that error appears in the above-identified patent and that said Letters Patent is hereby corrected as shown below:

Column 2, line 13, change "remains a" to --remains in a--.

Signed and Sealed this

*Nineteenth* Day of *August 1986*

[SEAL]

*Attest:*

DONALD J. QUIGG

*Attesting Officer* *Commissioner of Patents and Trademarks*